United States Patent [19]

Jeong

[11] Patent Number: 5,276,505
[45] Date of Patent: Jan. 4, 1994

[54] METHOD AND APPARATUS FOR EDITING IMAGE COLORS IN COLOR TELEVISION SYSTEM

[75] Inventor: Jin K. Jeong, Seoul, Rep. of Korea

[73] Assignee: Gold Star Co., Ltd., Seoul, Rep. of Korea

[21] Appl. No.: 789,668

[22] Filed: Nov. 8, 1991

[30] Foreign Application Priority Data

Nov. 8, 1990 [KR] Rep. of Korea ............ 18043/1990

[51] Int. Cl.$^5$ .................. H04N 9/74; H04N 9/64
[52] U.S. Cl. ................................ 358/22; 358/28
[58] Field of Search ............ 358/22, 22CK, 28

[56] References Cited

U.S. PATENT DOCUMENTS

| 4,101,928 | 7/1978 | Sato et al. | 358/28 |
| 4,525,736 | 6/1985 | Korman | 358/28 |
| 4,533,938 | 8/1985 | Hurst | 358/27 |
| 4,819,077 | 4/1989 | Kikachi et al. | 358/28 |

FOREIGN PATENT DOCUMENTS

| 0068321 | 7/1977 | Japan | 358/28 |
| 0172083 | 10/1983 | Japan | 358/22 |
| 0060559 | 4/1984 | Japan | 358/22 |
| 0092088 | 3/1990 | Japan | 358/22 |

Primary Examiner—John K. Peng
Attorney, Agent, or Firm—Fish & Richardson

[57] ABSTRACT

An apparatus for editing image colors in a color display, comprising time signal generating circuitry for detecting time intervals in which a plurality of color signals are displayed on the screen during one horizontal interval in accordance with color difference signals and outputting a signal corresponding to the detected time intervals, switching circuitry for outputting a signal corresponding to a desired color instead of a target color during a time interval of the target color of one horizontal interval according to an external control means controller, and a controller which contains controlling the target color and desired color by selection of the user and substituting the desired color for the target color. Also, a method of editing the image colors in the color display in accordance with. Therefore, the user can edit variously the image colors in the color display and watch a picture in the desired image colors on a color display screen.

3 Claims, 7 Drawing Sheets

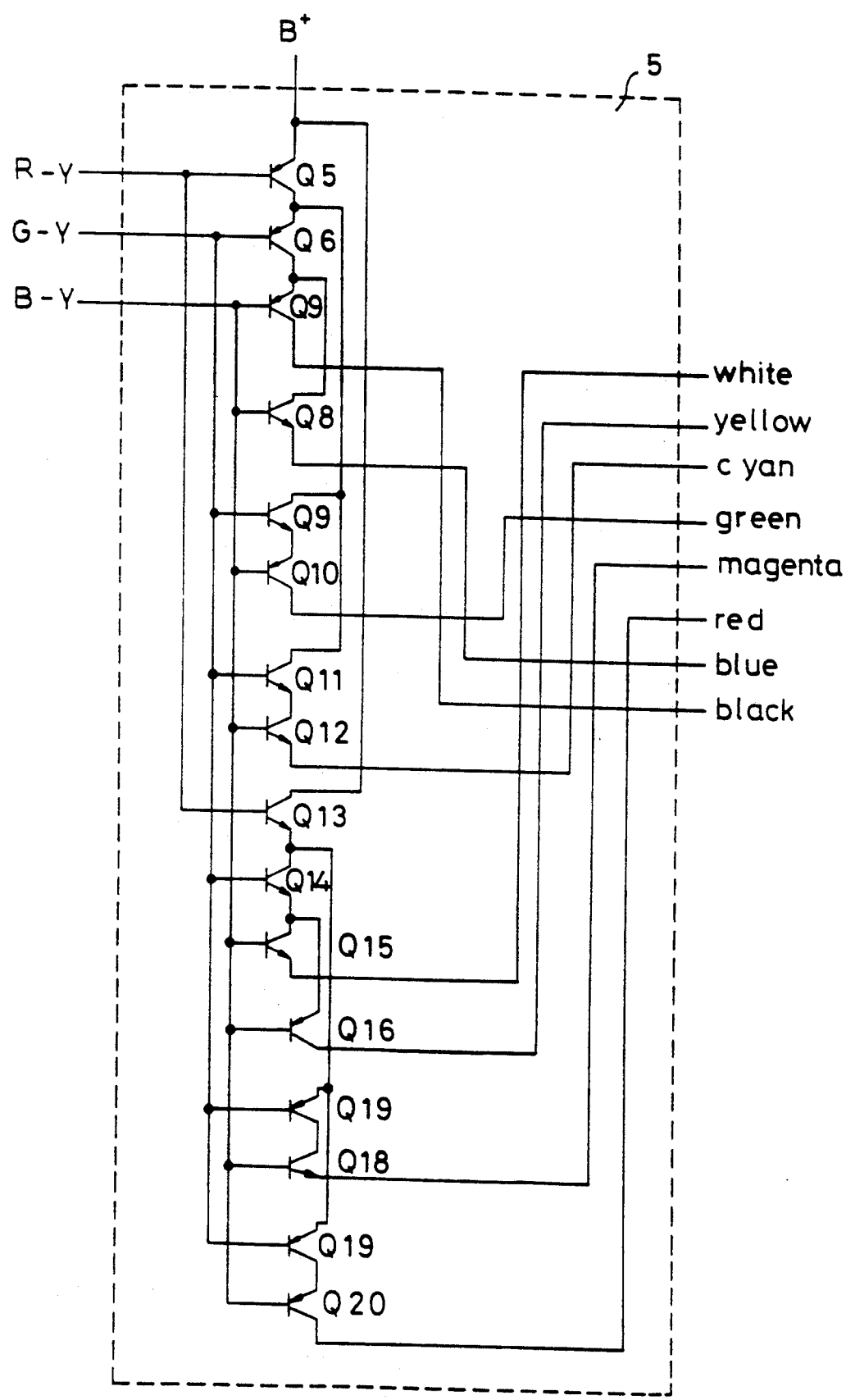

METHOD AND APPARATUS FOR EDITING IMAGE COLORS IN COLOR TELEVISION SYSTEM

BACKGROUND OF THE INVENTION

1. Field of the Invention

The present invention relates in general to a color television system, and more particularly to a method and apparatus for editing image colors in the color television system which are capable of changing the image colors of a broadcasting signal transmitted from a broadcasting station into image colors required by a viewer so that the viewer can watch a picture of the desired image colors on the screen.

2. Description of the Related Art

With reference to FIG. 1, there is shown a block diagram of a basic construction of a typical color television system. As shown in the drawing, the color television system basically comprises a video processing circuit 1, an audio processing circuit 2, a synchronization, deflection and high voltage circuit 3, a color regenerating circuit 4, a convergence circuit 5 and a cathode ray tube (CRT) or a cathode picture tube (CPT) 6.

The video processing circuit 1 includes a tuner circuit 8, a video intermediate frequency amplifying and video detecting circuit 9, a video amplifying circuit 10 and an automatic gain control (AGC) circuit 11.

The tuner circuit 8 has a circuitry similar to that in a black and white (B/W) television system, but with stricter requirements than those of the B/W television system with respect to frequency characteristic, voltage standing wave ratio (VSWR) and variation of oscillating frequency for the purpose of precise regeneration of color.

The video intermediate frequency amplifying and video detecting circuit 9 includes several trap circuits, which are not present in the B/W television system, for preventing a beat interference of 920 KHz due to a frequency difference between a sound intermediate frequency and a chrominance signal.

The construction and operation of the video amplifying circuit 10 is typically as follows:

The single stage, video amplifying circuit converts impedance of a composite video signal inputted therein and then separates a chrominance signal and a luminance signal from the composite video signal of the converted impedance. The chrominance signal is then applied from the video amplifying circuit to a band pass amplifying circuit. At this time, transmission of the chrominance signal from the band pass amplifying circuit to a color output circuit is delayed more than that of the luminance signal due to the narrow band of the band pass amplifying circuit. As a result, there is a necessity for delaying the transmission of the luminance signal for the purpose of coincidence with the transmission of the chrominance signal. For this reason, in the video amplifying circuit, there is included a delay line for delaying the transmission of the luminance signal about 0.8–1.0 $\mu$s. However, the delay line has difficulty in obtaining a gain without impedance matching. Therefore, the video amplifying circuit 10 generally may include a four-stage amplifying circuit with further consideration of signal polarity. Further in this circuit, there is included an automatic resolution control (ARC) circuit or a DC restorer, for the further purpose of attenuation of 3.58 MHz signal.

The AGC circuit 11 has circuitry similar to that in the B/W television system, but it must maintain an output voltage from the video intermediate frequency amplifying and video detecting circuit 9 more uniformly than that of the B/W television system in consideration of DC restoration.

The audio processing circuit 2 has the same circuitry as that in the B/W television system. As above-mentioned, the video intermediate frequency amplifying and video detecting circuit 9 includes several trap circuits, which are not present in the B/W television system, for attenuating a sound carrier to prevent a beat interference of 920 KHz due to a frequency difference between the sound intermediate frequency and the chrominance signal. There is little signal component of 4.5 MHz in the output of the video intermediate frequency amplifying and video detecting circuit 9. For this reason, a separate 4.5 MHz detecting circuit is included to obtain a second sound intermediate frequency.

The synchronization, deflection and high voltage circuit 3 includes a synchronization circuit 13, a vertical deflection circuit 14, a horizontal deflection circuit 15 and a high voltage circuit 16.

The synchronization circuit 13 separates a synchronizing signal from the composite video signal from the video amplifying circuit 10, amplifies the separated synchronizing signal and then transfers the amplified synchronizing signal to the vertical and horizontal deflection circuits 14 and 15. The synchronization circuit 13 has the same circuitry as that in the B/W television system.

In the color television system, convergence of luminous flux can come out well only by applying perfectly uniform magnetic force to the Braun tube, due to the large diameter of the Braun tube. For this reason, the deflection coil becomes large in volume and requires a large deflection power. Also, additional circuits are added to extract signals necessary to the convergence of the luminous flux. As a result, vertical and horizontal output transformers have complex constructions. Herein, the horizontal scanning frequency is 15734.263 Hz and the vertical scanning frequency is 59.93 Hz. As known, the frequency difference between the vertical and horizontal scanning frequencies is small and thus not very important.

On the other hand, focus of the color Braun tube is degraded as variation of voltage. As a result, the high voltage circuit 16 is utilized for stability of high voltage.

The color regenerating circuit 4 includes a band pass amplifying circuit 17, a color synchronizing circuit 18, a demodulating circuit 19, a difference signal amplifying circuit 20 and a color output circuit 21.

The band pass amplifying circuit 17 separates and amplifies the chrominance signal of 3.58 MHz ±500 KHz from the composite video signal and outputs the amplified chrominance signal to the demodulating circuit 19. In the band pass amplifying circuit 17, there are added a color killer circuit for stopping the band pass amplification in the B/W broadcasting and an automatic color control (ACC) circuit for controlling an amplification degree.

The broadcasting station transmits a horizontal synchronizing signal with a subcarrier (8–12 Hz) being inserted into a back porch of the horizontal synchronizing signal, which is required to demodulate the chrominance signal. As a result, there is a necessity for producing continuously a burst signal, or a color synchronizing signal, being synchronized with the chrominance signal of 3.58 MHz. The color synchronizing circuit 18 functions to produce continuously such color synchronizing signal.

The demodulating circuit 19 detects the chrominance signal synchronously with the subcarrier and extracts color difference signals $E_R-E_Y$, $E_G-E_Y$, $E_B-E_Y$. As a result, the output frequency of the demodulating circuit 19 is not 3.58 MHz, but 0-500 KHz.

The difference signal amplifying circuit 20 amplifies the output signal from the demodulating circuit 19 by a predetermined amplification degree.

The color output circuit 21 subtracts the luminance signal from the difference signals from the demodulating circuit 19 to produce the three primary colors $E_R$, $E_G$ and $E_B$.

In a shadow mask type Braun tube, three electron guns are used each of which is slightly inclined inwardly with respect to the center axis of the Braun tube. With this arrangement, a set of three electron beams simultaneously converges on the surface of a shadow mask and pass through apertures formed at the shadow mask to excite fluorescent materials of red, blue and green colors, thereby causing the fluorescent materials to emit light.

Since the distance from the deflection start point to the center of shadow mask is shorter than the radius of curvature of the shadow mask, however, three electron beams are converged on the place before the shadow mask surface, at the shadow mask portions except the center portion of shadow mask, thereby causing them to hardly pass the same aperture. As a result, the reproduced image on the screen may be unsightly, because the chromatic aberration of the image becomes more severe at the screen portions which become more distant from the center portion of screen. For avoiding this phenomenon and making electron beams pass well through apertures at the entire shadow mask portions, it is required to flow current of parabolic, each occurrences wave type having the frequency identical to horizontal and vertical scanning frequencies, through a convergence coil. The circuit forming the above-mentioned parabolic, each occurrences wave is the convergence circuit 5.

As shown in FIG. 2, the CRT 6 is provided with a heater H, a cathode K, a control grid G1, a screen grid G2, a focus electrode G3, an anode electrode G4, prefocus lens L1, a focus lens L2 and a phosphor screen 9. Thermions are emitted from the cathode K heated by the heater H. The emitted thermions are controlled by the control grid G1 and are then drawn by a voltage of the screen grid G2. The thermions passed through the screen grid G2 are focused and accelerated respectively at the focus electrode G3 and the anode electrode G4. Then, the thermions are radiated from the phosphor screen 9. At this time, if the thermions arrived at the phosphor screen 9 are large in amount, the brightness is more strong. As a result, the brightness can be adjusted as variation in amount of the thermions. The amount of the thermions is determined by a relative voltage among the cathode K, the control grid G1 and the screen grid G2. Namely, (control grid voltage)−(cathode voltage)=(bias voltage). Also, as the screen grid voltage is increased, the anode current is increased, thereby making the screen brighter.

The reference numeral 7 in FIG. 1 designates a portion of the color television system corresponding to the output of the chrominance signal.

With reference to FIG. 3, there is shown a detailed block diagram of the portion 7 of the color television system corresponding to the output of the chrominance signal in FIG. 1. As shown in this drawing, the demodulating circuit 19 detects from the output signal from the band pass amplifying circuit 17 in accordance with the output signal from the color synchronizing circuit 18, a red-luminance signal, referred hereinafter to as R-Y, a green-luminance signal, referred hereinafter to as G-Y, and a blue-luminance signal, referred hereinafter to as B-Y. Then, the demodulating circuit 19 outputs the detected R-Y, G-Y and B-Y signals to the difference signal amplifying circuit 20. The difference signal amplifying circuit 20 amplifies the inputted R-Y, G-Y and B-Y signals by a predetermined amplification degree and then outputs the amplified R-Y, G-Y and B-Y signals respectively to a R signal output circuit 21a, a G signal output circuit 21b and a B signal output circuit 21c, in the color output circuit 21. The color output circuit 21 eliminates the luminance signal Y from the inputted R-Y, G-Y and B-Y signals to obtain pure color signals, R, G and B, and then outputs the color signals R, G and B respectively to the corresponding cathode K in the CRT 6.

However, the conventional color television system has a disadvantage, in that it displays the image colors transmitted from the broadcasting station directly through the CRT 6 without any variation. There has recently been required an apparatus for editing the image colors in the color television system, which is capable of changing the image colors variously so that the color television system may be utilized for instance in juvenile education for educating the children how to make a distinction between colors.

SUMMARY OF THE INVENTION

Therefore, the present invention has been made in view of the above problem, and it is an object of the present invention to provide a method and apparatus for editing image colors in a color television system, which are capable of changing the image colors of a broadcasting signal transmitted from a broadcasting station into the image colors required by a viewer so that the viewer can watch a picture of the desired image colors on the screen.

In accordance with one aspect of the present invention, there is provided an apparatus for editing image colors in a color television system, comprising: demodulating means for detecting difference signals from a chrominance signal; time signal generating means for detecting time intervals in which a plurality of color signals are displayed on the screen during one horizontal interval in accordance with the difference signals from said demodulating means and outputting a signal corresponding to the detected time intervals; first switching means for selectively outputting an output signals from said time signal generating means in accordance with an external control signal; second switching means for selectively outputting the difference signals inputted therein, in accordance with an external control signal, during the time interval corresponding to an output signal from said first switching means; control means for providing a first control signal to said first switching means and a second control signal to said second switching means, in accordance with a plurality of key signals inputted therein, said first control signal corresponding to a target color, said second control signal corresponding to a desired color; key signal generating means for providing said plurality of key signals to said control means in accordance with selection of the user; and color output means for obtaining pure color signals by subtracting a luminance signal from the difference signals inputted through said second switching means and outputting the pure color signals to a CRT.

In accordance with another aspect of the present invention, there is provided a method of editing image colors in a color television system, comprising the steps of: (a) checking whether a first key signal, first inputted, corresponds to an image color edit signal; (b) perceiving a target color and a desired color by second and third key signals, thereafter inputted, if the first key signal corresponds to an image color edit signal, unless the first key signal does not correspond to an image color edit signal; (c) obtaining a signal corresponding to a time interval of the target color during one horizontal interval on the screen; (d) substituting the desired color for the target color during the time interval of the target color; and (e) displaying the desired color on the screen of the CRT.

BRIEF DESCRIPTION OF THE DRAWINGS

The above and other objects, features and advantages of the present invention will be more clearly understood from the following detailed description taken in conjunction with the accompanying drawings, in which:

FIG. 5 is a detailed circuit diagram of a time signal generating circuit in FIG. 4;

DETAILED DESCRIPTION OF THE PREFERRED EMBODIMENTS

First, a construction of an apparatus for editing image colors in a color display in accordance with the present invention will be described.

Figure 1:
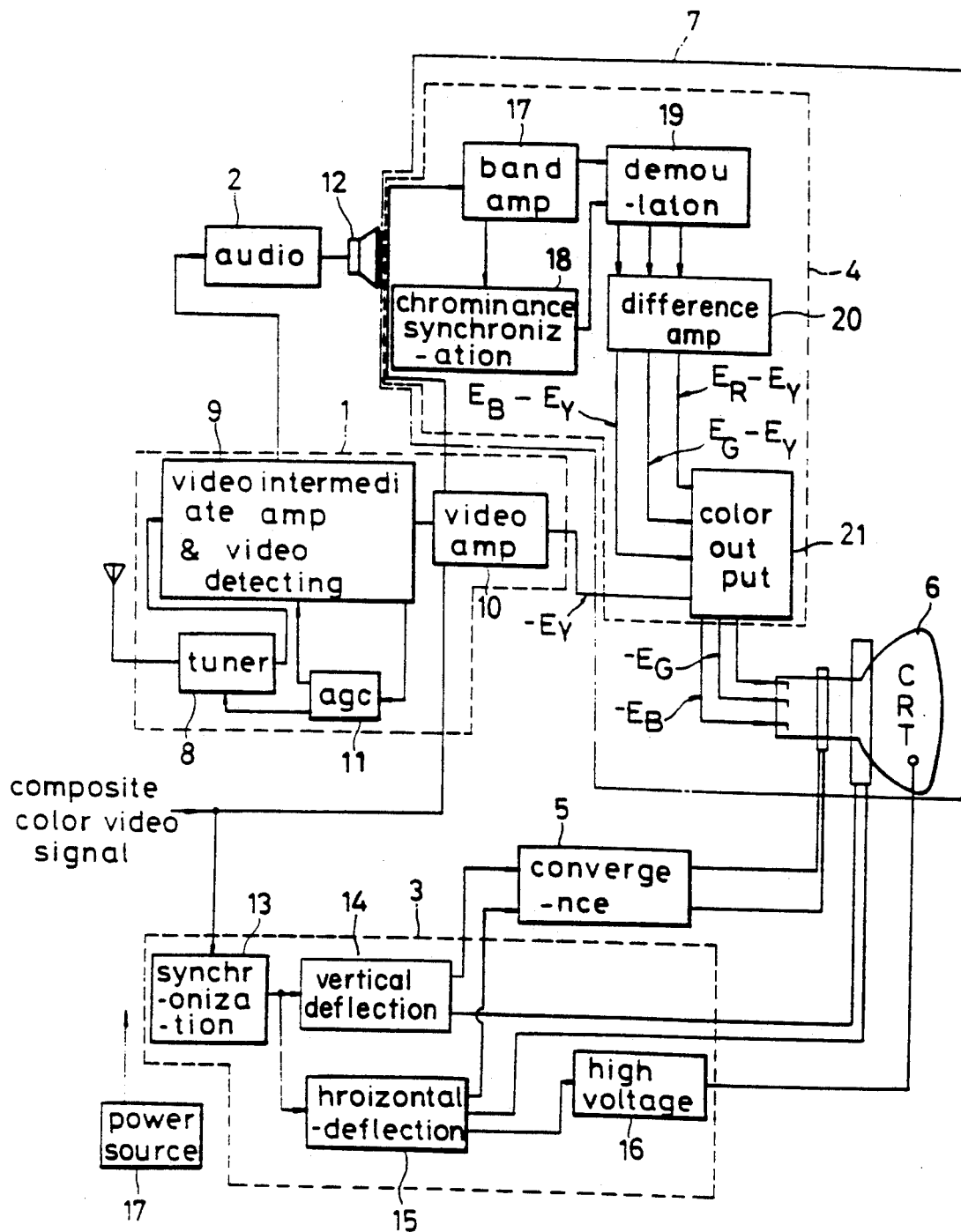
FIG. 1 is a block diagram of a basic construction of a typical color television system.
Figure 2:
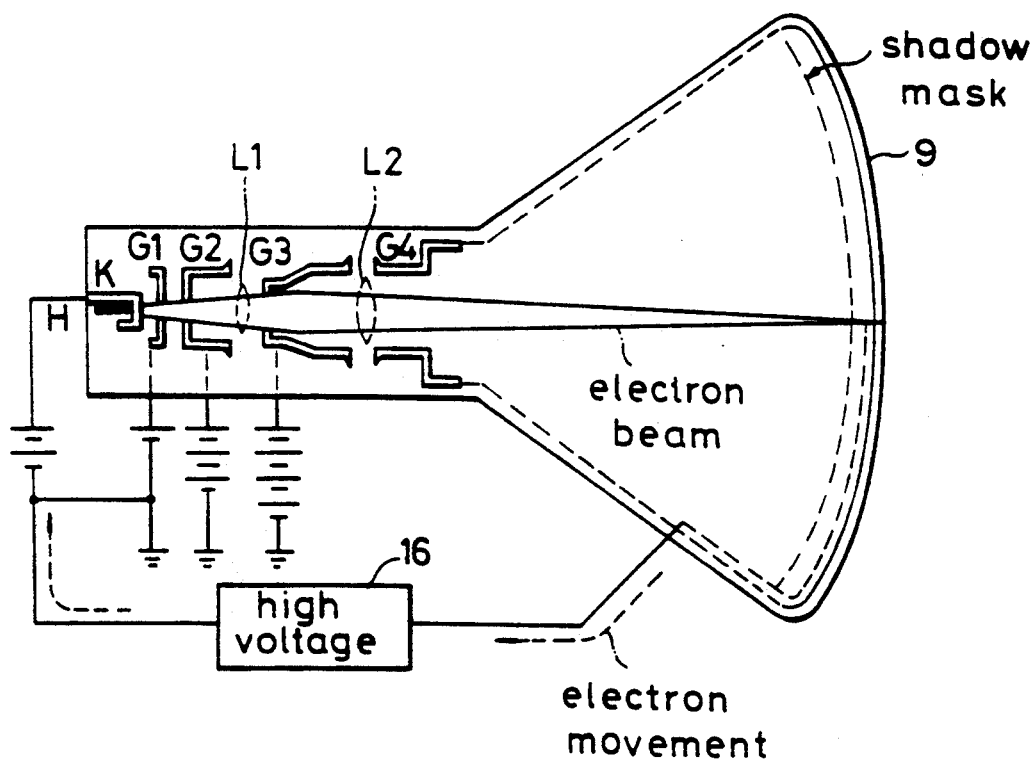
FIG. 2 is a view illustrating, in detail, a construction of a CRT in FIG. 1.
Figure 3:
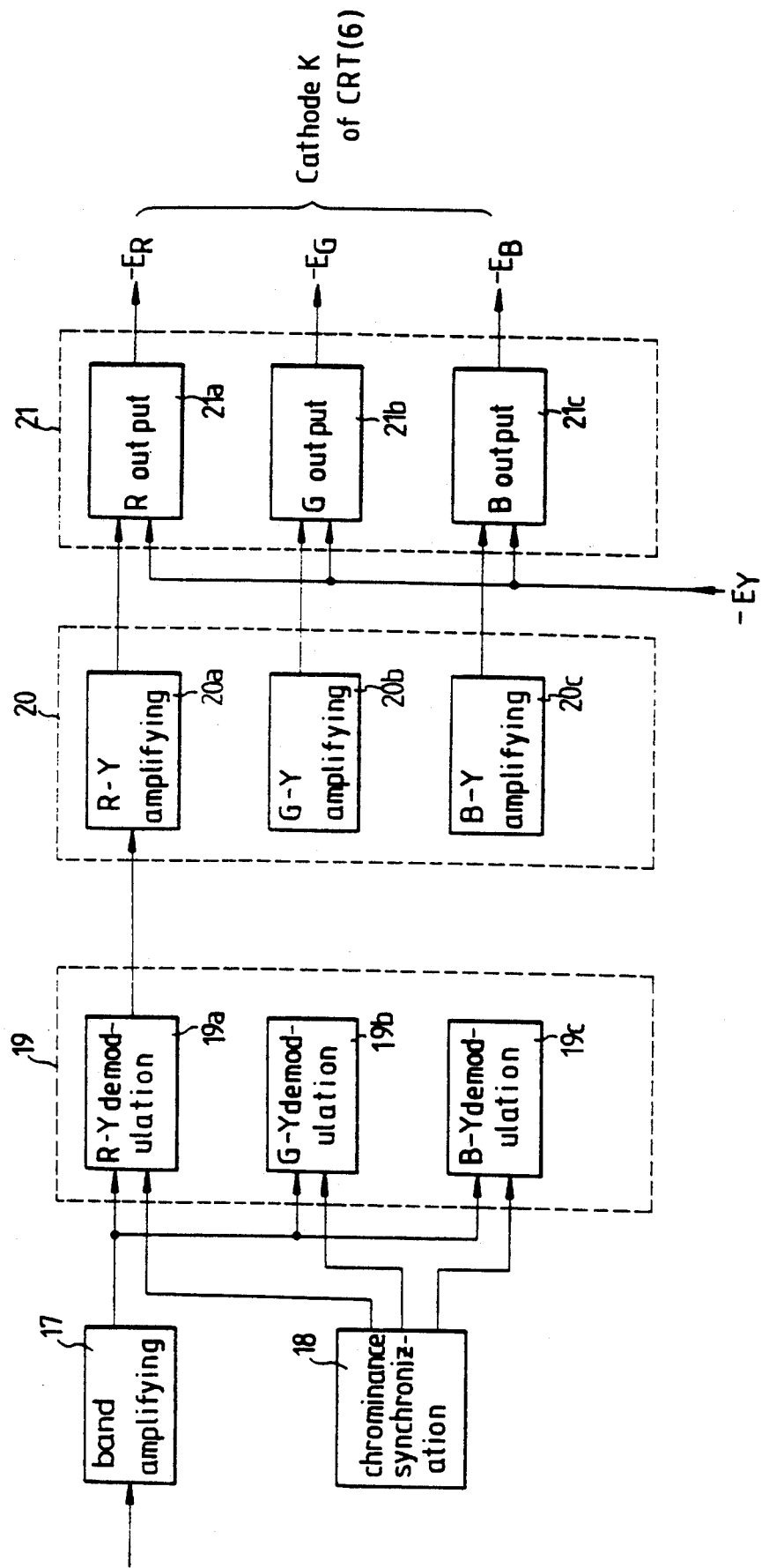
FIG. 3 is a detailed block diagram of a portion of the color television system corresponding to output of a chrominance signal in FIG. 1.
Figure 4:
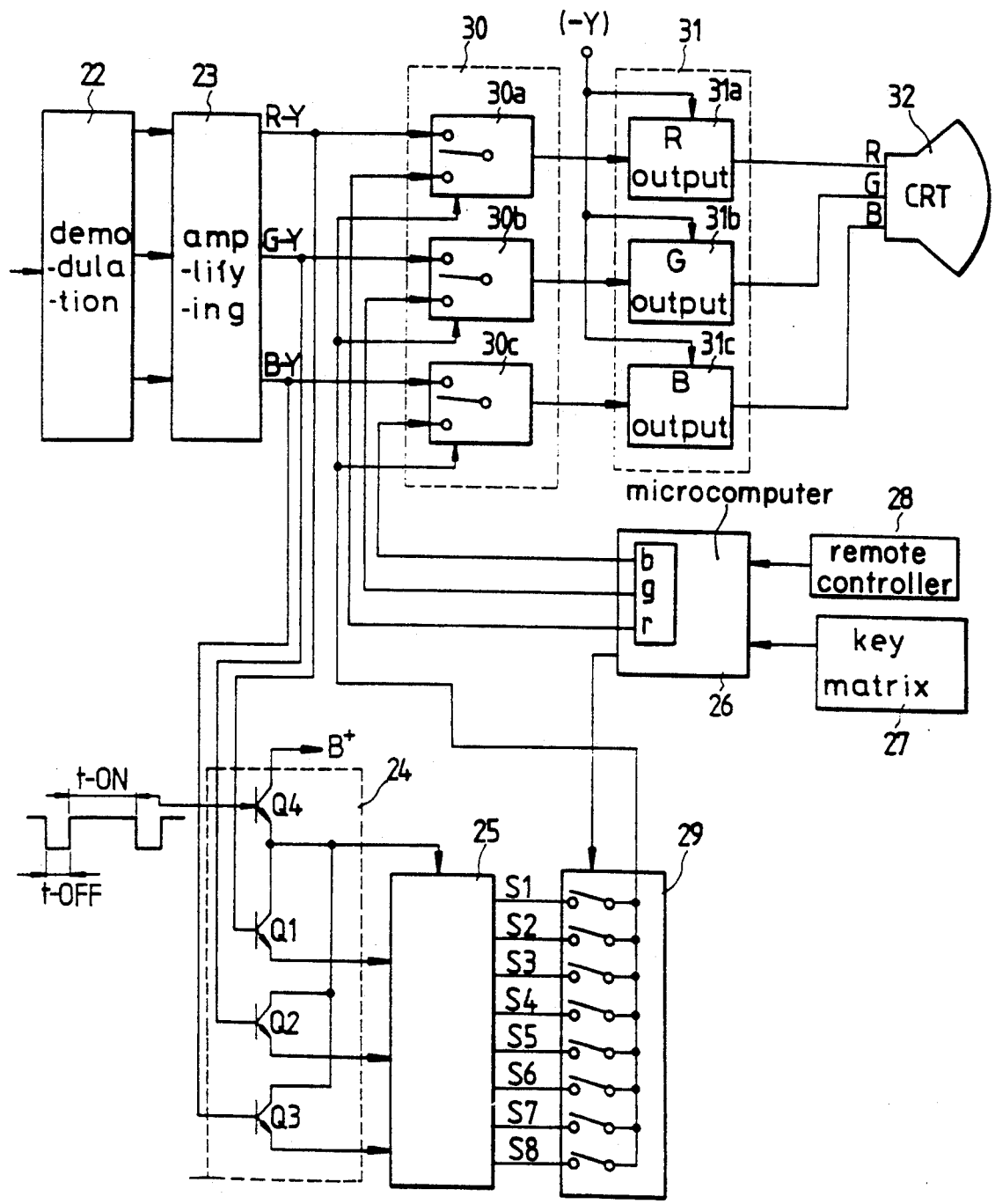
FIG. 4 is a block diagram of an apparatus for editing image colors in a color television system in accordance with the present invention.

With reference to FIG. 4, there is shown a block diagram of the apparatus for editing the image colors in the color television system in accordance with the present invention. The apparatus of the present invention in FIG. 4 corresponds to the portion 7 of the color television system corresponding to the output of the chrominance signal in FIG. 1.

As shown in this drawing, the apparatus of the present invention comprises a demodulating circuit 22 for detecting difference signals R-Y, G-Y and B-Y from the inputted chrominance signal, an amplifying circuit 23 for amplifying the difference signals R-Y, G-Y and B-Y from the demodulating circuit 22 by a predetermined amplification degree, a first switching circuit 24 including a plurality of transistors Q1 through Q4, for selectively outputting the difference signals R-Y, G-Y and B-Y from the amplifying circuit 23 during a scanning interval and not during a horizontal synchronizing interval, in accordance with a horizontal synchronizing signal, a time signal generating circuit 25 for detecting each of time intervals in which eight color signals, white, yellow, cyan, green, magenta, red, blue and black signals are displayed on the screen of a CRT 32 during one horizontal interval in accordance with the difference signals R-Y, G-Y and B-Y from the first switching circuit 24 and outputting a signal corresponding to each of the detected time intervals, a microcomputer 26 for providing a plurality of control signals necessary to the apparatus in accordance with a plurality of key signals, a key matrix unit 27 for manually providing the key signals to the microcomputer 26 in accordance with selection of the user, a remote controller 28 for providing the key signals remotely to the microcomputer 26 in accordance with selection of the user, and a second switching circuit 29 including a plurality of switches S1 through S8 connected respectively to output terminals of the time signal generating circuit 25, from which the time interval signals corresponding to the eight color signals are respectively relayed. Herein, one of the eight switches S1 through S8 in the second switching circuit 29 is selectively turned on under a control of the microcomputer 26.

Also, the apparatus of the present invention comprises a third switching circuit 30 including a plurality of switches 30a, 30b and 30c, for inputting respectively the difference signals R-Y, G-Y and B-Y from the demodulating circuit 22, the time interval signals corresponding to the eight color signals being displayed on the screen of the CRT 32 during one horizontal interval from the second switching circuit 29, and drive control signals, corresponding to a desired color, from the microcomputer 26 and selectively outputting the difference signals R-Y, G-Y and B-Y corresponding to the desired color instead of a target color during a time interval of the target color.

Also, the apparatus of the present invention comprises a color output circuit 31 including R, G and B signal output circuits 31a, 31b and 31c, for inputting respectively the difference signals R-Y, G-Y and B-Y from the switches 30a, 30b and 30c in the third switching circuit 30, obtaining pure color signals R, G and B by subtracting the luminance signal Y from the difference signals R-Y, G-Y and B-Y, and outputting the pure three color signals R, G and B to the CRT 32. Herein, the CRT 32 functions to display the three color signals R, G and B from the color output circuit 31.

The second switching circuit 29 provides a time interval signal corresponding to the target color during one horizontal interval on the screen to the third switching circuit 30, in accordance with a control signal from the microcomputer 26 based on selection of the user.

On the other hand, the third switching circuit 30 selectively outputs the difference signals R-Y, G-Y and B-Y corresponding to the desired color instead of the target color to the color output circuit 31 during a time interval of the target color, in accordance with a control signal from the microcomputer based on selection of the user.

Now, the operation of the apparatus with the above-mentioned construction in accordance with the present invention will be described in detail.

First, if the three difference signals R-Y, G-Y and B-Y from the demodulating circuit 22 are applied respectively to the switches 30a, 30b and 30c in the third switching circuit 30 and respectively to the bases of the transistors Q1 through Q3 in the first switching circuit 24 and the horizontal synchronizing signal is applied to the base of the transistor Q4 in the first switching circuit 24, the transistor Q4 is turned off during the interval $t_{OFF}$ of the horizontal synchronizing signal, thereby allowing the voltage B+ not to appear at the collectors of the transistors Q1 through Q3. As a result, the transistors Q1 through Q3 are turned off, too. As a result the three difference signals R-Y, G-Y and B-Y applied respectively to the bases of the transistors Q1 through Q3 cannot be applied to the time signal generating circuit 25. On the other hand, during the interval $t_{ON}$ of the horizontal synchronizing signal, i.e., during the scanning interval, the transistor Q4 is turned on, thereby allowing the voltage B+ to be applied to the collectors of the transistors Q1 through Q3. As a result, the transistors Q1 through Q3 are turned on. As a result, the three difference signals R-Y, G-Y and B-Y are applied to the time signal generating circuit 25 through the transistors Q1 through Q3.

As a result, only during the scanning interval $t_{ON}$, the time signal generating circuit 25 can generate a signal corresponding to each of time intervals in which the eight color signals, white, yellow, cyan, green, magenta, red, blue and black signals are actually displayed on the screen of the CRT 32 during one horizontal interval in accordance with the difference signals R-Y, G-Y and B-Y from the first switching circuit 24.

Figure 6A:
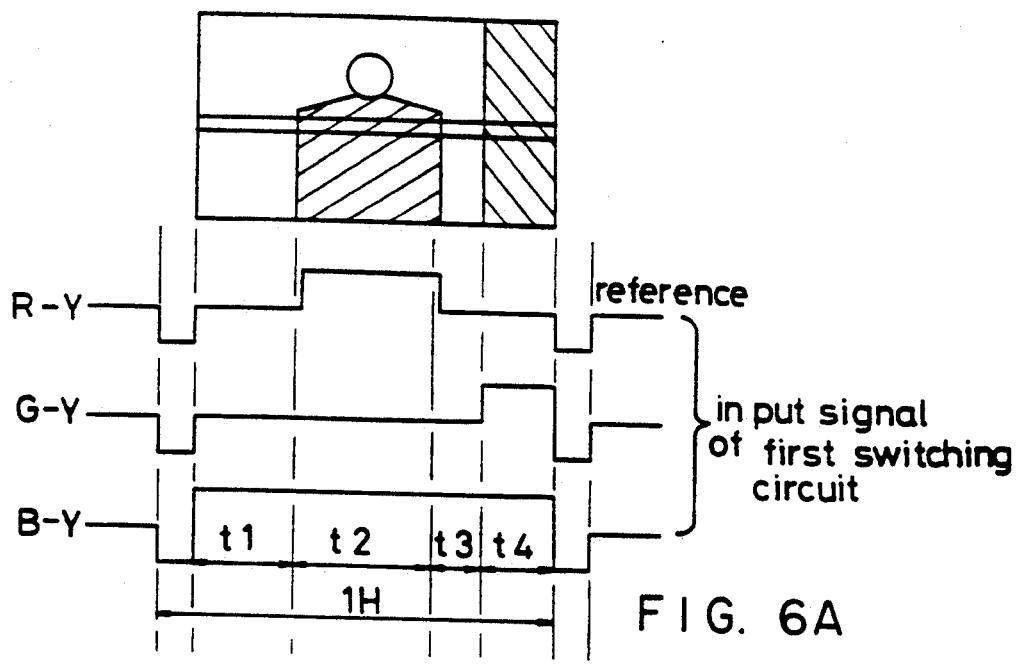
FIGS. 6A and 6B are timing diagrams illustrating the operation of the time signal generating circuit in FIG. 5.
Figure 6B:
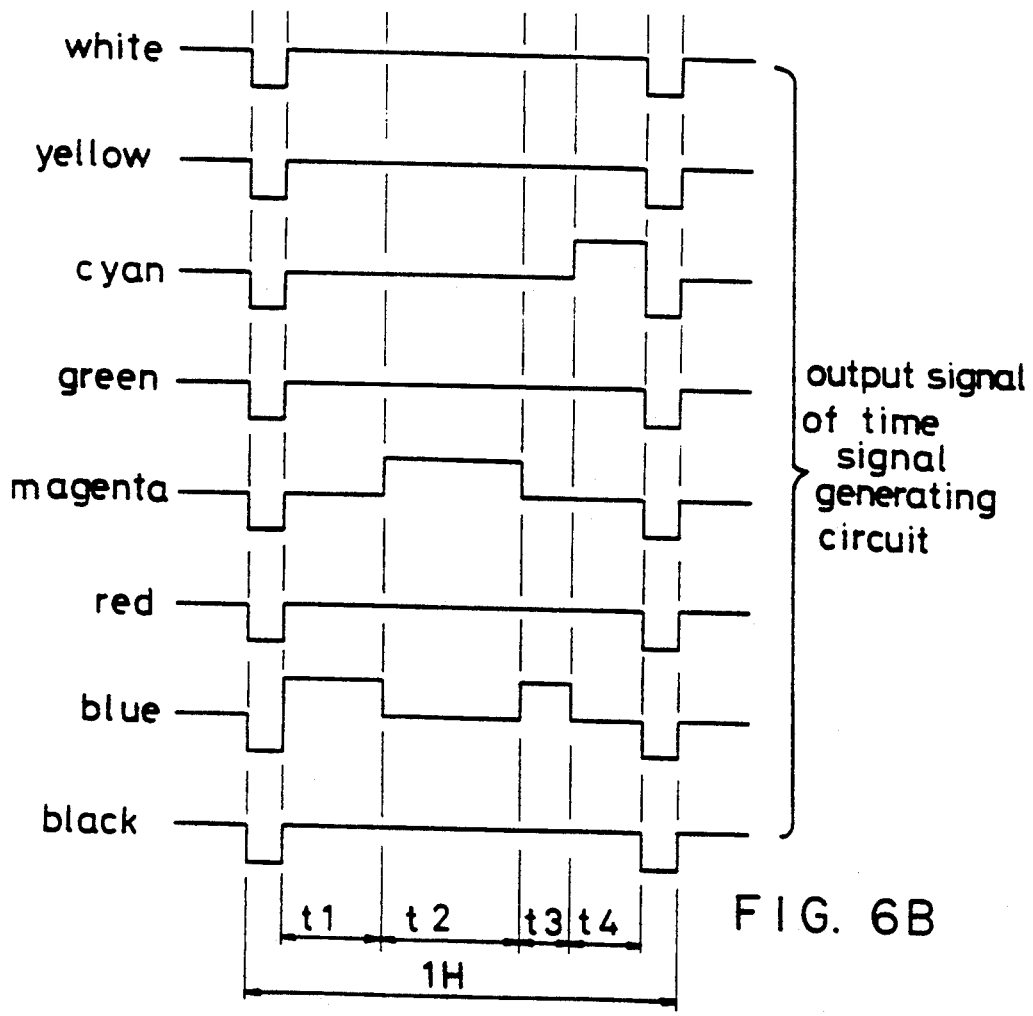

FIG. 5 is a detailed circuit diagram of the time signal generating circuit 25 and FIGS. 6A and 6B are timing diagrams illustrating the operation of the time signal generating circuit 25.

For example, the combination of the three difference signals R-Y, G-Y and B-Y as shown in FIG. 6A are displayed as the combination of the eight image color signals as shown in FIG. 6B on the screen of the CRT 32.

As shown in FIGS. 5 and 6A and 6B, during the time interval t1 of the horizontal interval 1H, the difference signal R-Y turns on a transistor Q5, the difference signal G-Y turns on a transistor Q6 and the difference signal B-Y turns on a transistor Q8. As a result, the voltage B+ appears as the blue color time signal at the switch S7 in the second switching circuit 29 via the transistors Q5, Q6 and Q8.

During the time interval t2 of the horizontal interval 1H, the difference signal R-Y turns on the transistor Q13, the difference signal G-Y turns on the transistor Q17 and the difference signal G-Y turns on the transistor Q18. As a result, the voltage B+ appears as the magenta color time signal at the switch S5 in the second switching circuit 29 via the transistors Q13, Q17 and Q18.

Also, during the time interval t3 of the horizontal interval 1H, the difference signal R-Y turns on the transistor Q5, the difference signal G-Y turns on the transistor Q6 and the difference signal B-Y turns on the transistor Q8. As a result, the voltage B+ appears as the blue color time signal at the switch S7 in the second switching circuit 29 via the transistors Q5, Q6 and Q8, similarly to that of the time interval t1.

On the other hand, during the time interval t4 of the horizontal interval 1H, the difference signal R-Y turns on the transistor Q5, the difference signal G-Y turns on a transistor Q11 and the difference signal B-Y turns on a transistor Q12. As a result, the voltage B+ appears as the cyan color time signal at the switch S3 in the second switching circuit 29 via the transistors Q5, Q11 and Q12.

Namely, from the output terminals of the time signal generating circuit 25 are outputted the signal corresponding to each of time intervals in which the eight color signals, white, yellow, cyan, green, magenta, red, blue and black signals are actually displayed on the screen of the CRT 32 during one horizontal interval in accordance with the combination of the difference signals R-Y, G-Y and B-Y.

The following Table 1 illustrates ON/OFF states of the transistors Q5 through Q20 in the time signal generating circuit 25 in accordance with the eight colors when the difference signals R-Y, G-Y and B-Y from the first switching circuit 24 are inputted.

TABLE 1

| COLOR | Q | | | | | | | | | | | | | | | |
|---|---|---|---|---|---|---|---|---|---|---|---|---|---|---|---|---|
| | 5 | 6 | 7 | 8 | 9 | 10 | 11 | 12 | 13 | 14 | 15 | 16 | 17 | 18 | 19 | 20 |
| WHITE | X | X | X | X | X | X | X | X | O | O | O | X | X | X | X | X |
| YELLOW | X | X | X | X | X | X | X | X | O | O | X | O | X | X | X | X |
| CYAN | O | X | X | X | X | X | O | O | X | X | X | X | X | X | X | X |
| GREEN | O | X | X | X | O | O | X | X | X | X | X | X | X | X | X | X |
| MAGENTA | X | X | X | X | X | X | X | X | O | X | X | X | O | O | X | X |
| RED | X | X | X | X | X | X | X | X | O | X | X | X | X | X | O | O |
| BLUE | O | O | X | O | X | X | X | X | X | X | X | X | X | X | X | X |
| BLACK | O | O | O | X | X | X | X | X | X | X | X | X | X | X | X | X |

(X: OFF, O: ON)

Figure 7:
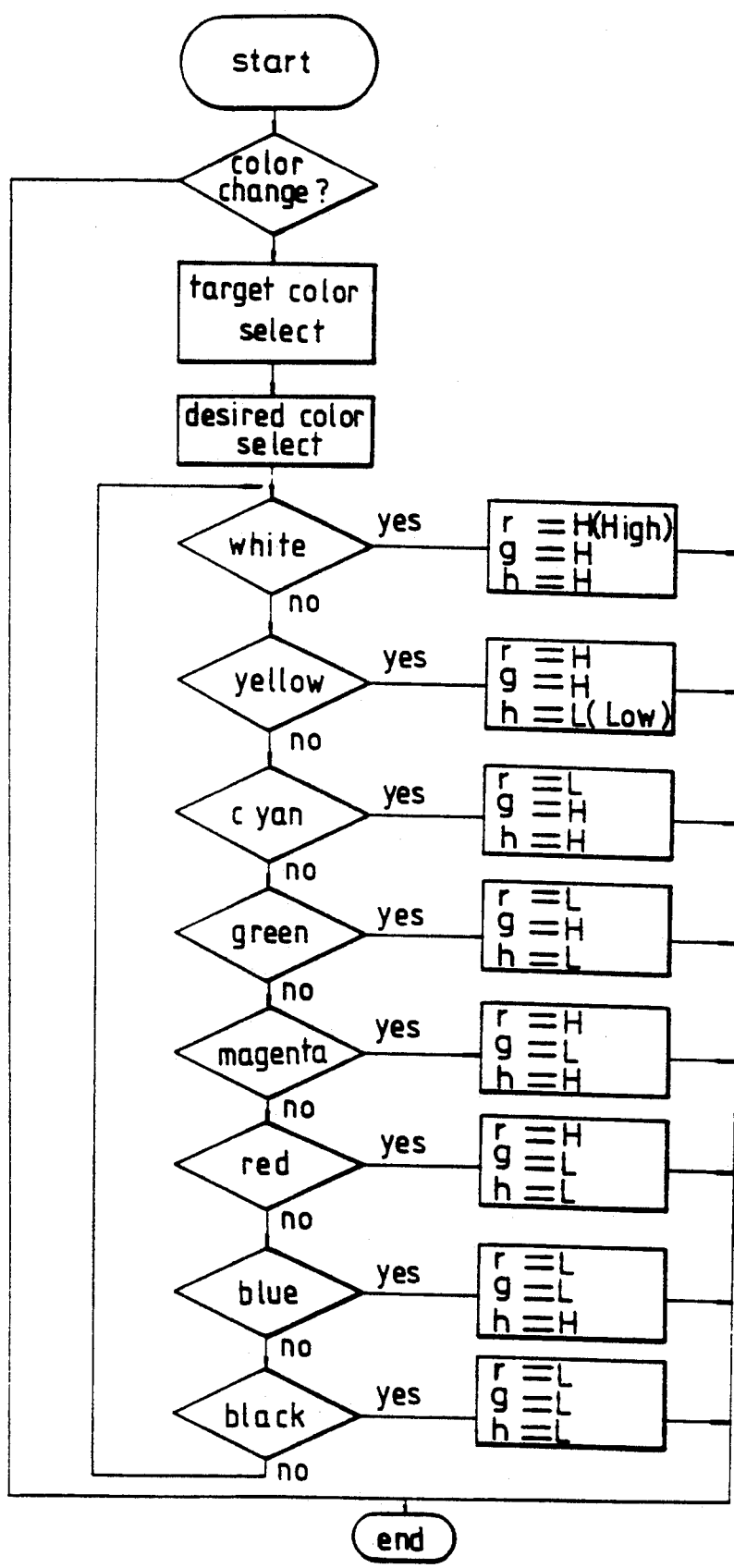
FIG. 7 is a flowchart illustrating of the operation of the apparatus for editing the image colors in the color television system in accordance with the present invention.

On the other hand, if the user would like to substitute a desired color for a target color, or one color of the image colors displayed on the screen of the CRT 32 to watch the desired color through the screen, he or she first selects the target color by meas of the remote controller 28 or the key matrix unit 27, as shown in FIG. 7. Then, the microcomputer 26 responsive to the selection of the user turns on the switch in the second switching circuit 29 corresponding to the target color and outputs logic signals as shown in the following Table 2 to the switches 30a, 30b and 30c in the third switching circuit 30, corresponding to the time interval of the target color of one horizontal interval.

TABLE 2

| r | g | b | COLOR |
|---|---|---|---|
| 0 | 0 | 0 | BLACK |
| 0 | 0 | 1 | BLUE |
| 0 | 1 | 0 | GREEN |
| 0 | 1 | 1 | CYAN |
| 1 | 0 | 0 | RED |
| 1 | 0 | 1 | MAGENTA |
| 1 | 1 | 0 | YELLOW |
| 1 | 1 | 1 | WHITE |

For instance, in a case where the magenta color of clothes which a person is wearing on the screen of the CRT 32, as shown in FIG. 6A, is substituted with the yellow color, if the magenta color is selected as the target color during the time interval t2 in FIG. 6B, the microcomputer 26 turns on the switch S5 in the second switching circuit 29 being applied with the time signal of the magenta color as shown in FIG. 6B, so that the time signal of the magenta color is applied to the switches 30a, 30b and 30c in the third switching circuit 30. Then, when the yellow color is selected as the desired color by selection of the user, the microcomputer 26 outputs a high, high, low signal as shown in Table 2, as a combination signal corresponding to the yellow color, through its output terminals r, g and b to the switches 30a, 30b and 30c in the third switching circuit 30. As a result, the switches 30a and 30b in the third switching circuit 30 are turned on to output the color signals R and G during the display time interval of the magenta color, i.e., during the time interval t2 in FIG. 6 and thus on the screen of the CRT 32 is displayed the image of the yellow color instead of the magenta color.

As hereinbefore described, the present invention provides a method and an apparatus capable of changing the image colors of the broadcasting signal transmitted from the broadcasting station into the of image colors required by the viewer in the television system so that the viewer can watch a picture in his the desired image colors. Therefore, the color television system can for instance be to teach children how to distinguish colors.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for editing image colors in a color display, comprising:
    demodulating means for detecting difference signals from a chrominance signal;
    time signal generating means for detecting time intervals in which a plurality of color signals are displayed on a screen during one horizontal interval in accordance with the difference signals from said demodulating means and outputting a signal corresponding to the detected time intervals;
    first switching means for selectively outputting an output signal from said time signal generating means in accordance with an external control signal;
    second switching means for selectively outputting the difference signals inputted therein, in accordance with an external control signal, during the time interval corresponding to the output signal from said first switching means;
    control means for providing a first control signal to said first switching means and a second control signal to said second switching means, in accordance with a plurality of key signals inputted therein, said first control signal corresponding to a target color, said second control signal corresponding to a desired color;
    key signal generating means for providing said plurality of key signals to said control means in accordance with a selection from a user; and
    color output means for obtaining pure color signals by subtracting a luminance signal from the difference signals inputted through said second switching means and outputting the pure color signals to a color display screen.

2. An apparatus as set forth in claim 1, further comprising third switching means between said demodulating means and said time signal generating means, for selectively outputting the difference signals from said demodulating means to said time signal generating means during said one horizontal interval.

3. A method of editing image colors in a color display, comprising the steps of:
    (a) checking whether a first key signal, first inputted, corresponds to an image color edit signal;
    (b) perceiving a target color and a desired color by second and third key signals, thereafter inputted, if the first key signal corresponds to an image color edit signal,;
    (c) obtaining a signal corresponding to a time interval of the target color of one horizontal interval on the screen;
    (d) substituting the desired color for the target color during the time interval of the target color; and
    (e) displaying the desired color on a color display screen.

* * * * *